United States Patent
Palanki et al.

(10) Patent No.: US 8,457,221 B2
(45) Date of Patent: Jun. 4, 2013

(54) SIGNALING TRANSMISSION WITH LOCALIZED SPREADING FOR WIRELESS COMMUNICATION

(75) Inventors: Ravi Palanki, San Diego, CA (US); Siddhartha Mallik, Urbana, IL (US); Petru Cristian Budianu, San Diego, CA (US); Alexei Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 827 days.

(21) Appl. No.: 11/852,250

(22) Filed: Sep. 7, 2007

(65) Prior Publication Data

US 2008/0101441 A1    May 1, 2008

Related U.S. Application Data

(60) Provisional application No. 60/843,366, filed on Sep. 8, 2006.

(51) Int. Cl.
*H04K 1/10* (2006.01)
(52) U.S. Cl.
USPC ........... 375/260; 375/131; 375/144; 375/146; 375/148; 375/262; 375/267
(58) Field of Classification Search
USPC ............. 375/146, 148, 131, 144, 260, 262, 375/267; 370/208, 344, 329, 330, 203, 319, 370/324, 335
See application file for complete search history.

(56) References Cited

U.S. PATENT DOCUMENTS

| | | | |
|---|---|---|---|
| 5,852,630 A * | 12/1998 | Langberg et al. | 375/219 |
| 6,751,444 B1 | 6/2004 | Meiyappan | |
| 6,934,318 B2 | 8/2005 | Sarkar | |
| 7,143,330 B2 | 11/2006 | Ahn et al. | |
| 7,242,722 B2 | 7/2007 | Krauss et al. | |
| 7,526,035 B2 * | 4/2009 | Suh et al. | 375/260 |
| 2004/0162097 A1 | 8/2004 | Vijayan et al. | |
| 2004/0258134 A1 | 12/2004 | Cho et al. | |

(Continued)

FOREIGN PATENT DOCUMENTS

| | | |
|---|---|---|
| CN | 1681223 A | 10/2005 |
| JP | 2005124158 A | 5/2005 |

(Continued)

OTHER PUBLICATIONS

3GPP2 C.S0084-001-0 "Physical Layer for Ultra Mobile Broadband (UMB) Air Interface Specification," Apr. 5, 2007.

(Continued)

*Primary Examiner* — Dhaval Patel
(74) *Attorney, Agent, or Firm* — Peng Zhu

(57) ABSTRACT

Techniques for transmitting signaling with localized spreading are described. In one design, a transmitter (e.g., a base station) spreads multiple signaling symbols to obtain multiple sets of output symbols and further maps the multiple sets of output symbols to multiple time frequency blocks. The spreading may be localized to each time frequency block. Prior to the spreading, the transmitter may scale the multiple signaling symbols with multiple gains determined based on the transmit power for these signaling symbols. The transmitter may scramble the scaled signaling symbols to obtain scrambled symbols and may spread the scrambled symbols to obtain the multiple sets of output symbols. The transmitter may map each set of output symbols to a respective time frequency block.

44 Claims, 13 Drawing Sheets

U.S. PATENT DOCUMENTS

| | | | |
|---|---|---|---|
| 2005/0013350 A1* | 1/2005 | Coralli et al. | 375/148 |
| 2005/0111348 A1 | 5/2005 | Mottier et al. | |
| 2005/0120097 A1 | 6/2005 | Walton et al. | |
| 2006/0007883 A1 | 1/2006 | Tong et al. | |
| 2006/0045001 A1 | 3/2006 | Jalali | |
| 2006/0088114 A1 | 4/2006 | Chen et al. | |
| 2006/0256839 A1* | 11/2006 | Tsai et al. | 375/131 |
| 2006/0280256 A1* | 12/2006 | Kwon et al. | 375/260 |
| 2007/0064669 A1* | 3/2007 | Classon et al. | 370/347 |
| 2007/0263529 A1* | 11/2007 | Ishikura et al. | 370/211 |
| 2008/0212698 A1* | 9/2008 | Kim et al. | 375/260 |
| 2009/0041092 A1* | 2/2009 | Kim et al. | 375/146 |

FOREIGN PATENT DOCUMENTS

| | | | |
|---|---|---|---|
| JP | 2005323358 A | | 11/2005 |
| KR | 100689382 B1 | | 3/2007 |
| RU | 2120702 C1 | | 10/1998 |
| WO | WO2006007527 | | 1/2006 |
| WO | WO2006022136 | * | 3/2006 |
| WO | WO2006026344 | | 3/2006 |
| WO | WO2006069299 | | 6/2006 |

OTHER PUBLICATIONS

Written Opinion—PCT/US2007/078078, International Search Authority0 European Patent Office—Jan. 28, 2008.

International Search Report—PCT/US2007/078078, International Search Authority—European Patent Office—Jan. 28, 2008.

Elkashlan M. et al, Performance of Frequency-Hopping Multicarrier CDMA on a Uplink with Conference Proceedings, San Francisco, CA Dec. 1-5, 2003, IEEE Global Telecommunications Conference, NY, NY, IEEE, US, vol. 7 of 7, Dec. 1, 2003, pp. 3407-3411.

Hui Won Je et al, "A Novel Multiple Access Scheme for Uplink Cellular Systems," Vehicular Technology Conference, 2004, VTC2004-fall, 2004 IEEE 60th Los Angeles, CA, US, Sep. 26-29, 2004, Piscataway, NY, pp. 984-988.

Tonello A.M. et al. "An Asynchronous Multitone Multiuser Air Interface for High-speed Uplink Communications," Vehicular Technology Conference, 2003, VTC 2003 Fall, 2003 IEEE 58th, Orlando, FL, US Oct. 6-9, 2003, Piscataway, NJ, US, IEEE, US, pp. 2267-2271.

Uplink Communications, Vehicular Technology Conference, 2003, VTC 2003 Fall, 2003 IEEE 58th, Orlando, FL, US Oct. 6-9, 2003, Piscataway, NJ, US, IEEE, US, pp. 2267-2271.

Taiwan Search Report—TW096133736—TIPO—Feb. 22, 2012.

Tran L.C., et al., "STC-MIMO Block Spread OFDM in Frequency Selective Rayleith Fading Channels", Proceedings of the 11th IEEE Symposium on Computers and Communications (ISCC'06), Jun. 26-29, 2006.

Zhihong Hong et al., "Spatial Multiplexing in Correlated Fading via the Virtual Channel Representation", IEEE Journal on Selected Areas in Communications, IEEE Service Center, Piscataway, US, vol. 21, No. 5, Jun. 1, 2003, XP011065629, ISSN: 0733-8716, DOI: 001:10. 1109/JSAC.2003.81036.

3GPP RAN1: "3rd Generation Partnership Project; Technical Specification Group Radio Access Network; Evolved Universal Terrestrial Radio Access (E-UTRA) ; Physical layer procedures(Release 8)" 3GPP TS 36.213 V8.3.0, [Online] vol. 36.213, No. V8.3.0, May 1, 2008, pp. 1-45, XP002554705 Sophia Antipolis Retrieved from the Internet: URL:http://www.3gpp.org/ftp/Specs/archive/36-series/36.211/36213-830.zip> [retrieved on Nov. 9, 2009] p. 34, paragraph 8—p. 42, paragraph 9.1.2.

* cited by examiner

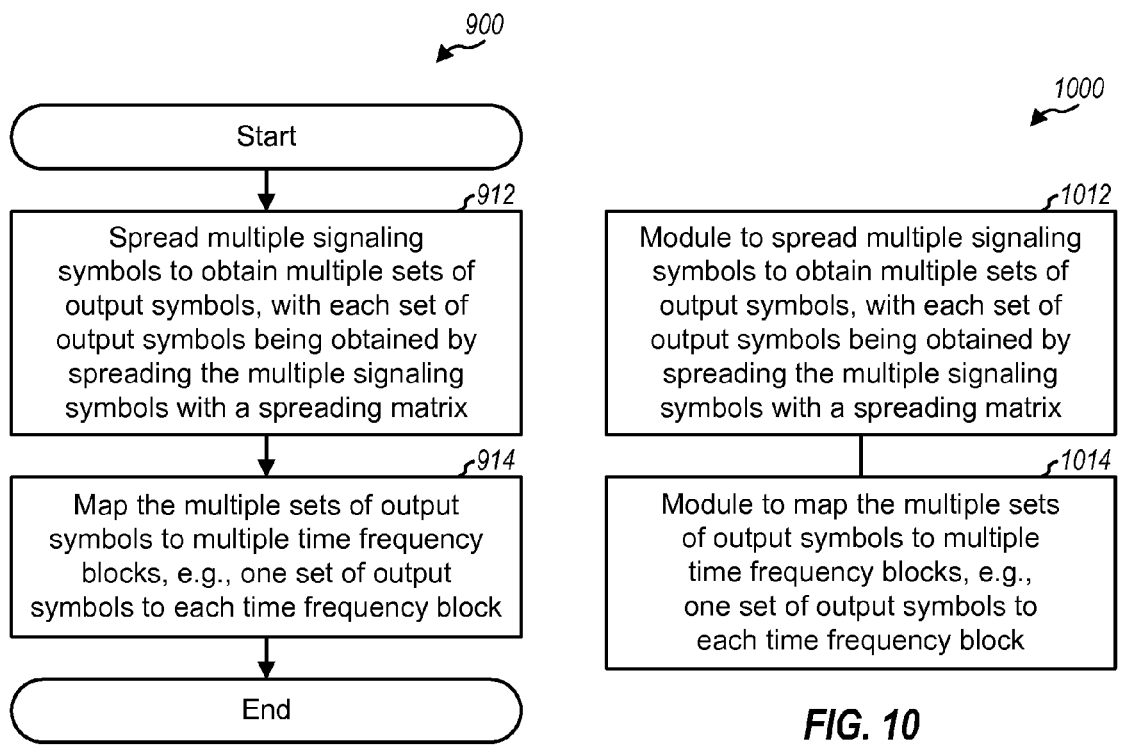

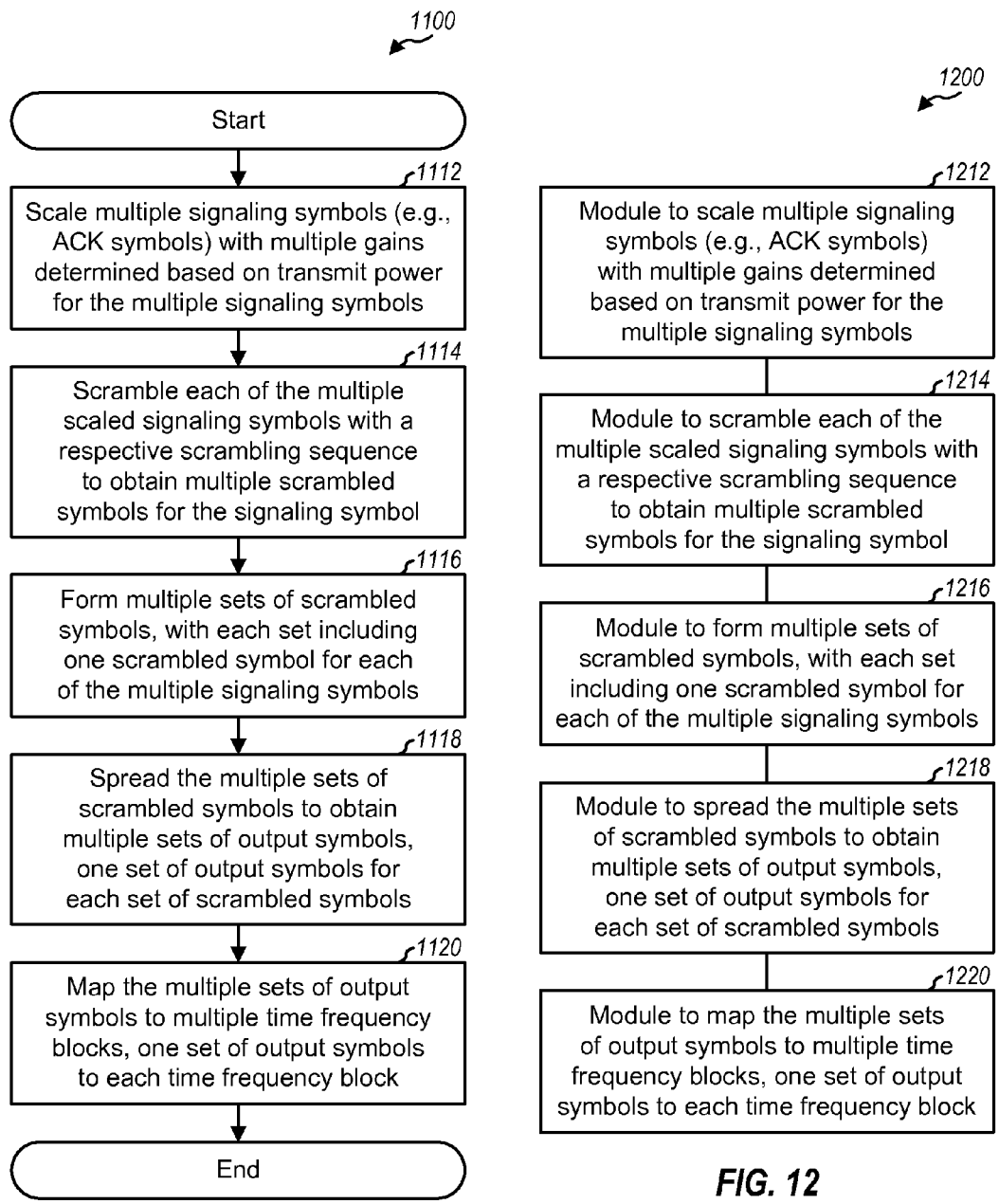

SIGNALING TRANSMISSION WITH LOCALIZED SPREADING FOR WIRELESS COMMUNICATION

The present application claims priority to provisional U.S. Application Ser. No. 60/843,366, entitled "Method and Apparatus for Enhanced ACK Spreading Design," filed Sep. 8, 2006, assigned to the assignee hereof and incorporated herein by reference.

BACKGROUND

I. Field

The present disclosure relates generally to communication, and more specifically to techniques for transmitting signaling in a wireless communication system.

II. Background

Wireless communication systems are widely deployed to provide various communication services such as voice, video, packet data, messaging, broadcast, etc. These systems may be multiple-access systems capable of supporting communication for multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include any number of base stations that can support communication for any number of terminals. Each base station may transmit data and signaling to terminals served by that base station. Each terminal may also transmit data and signaling to its serving base station. It may be desirable for a transmitter to transmit signaling such that it can be reliably received by an intended receiver. This may be achieved by encoding and/or repeating the signaling and transmitting the encoded and/or repeated signaling on radio resources allocated for the signaling. Transmitting signaling in this manner may improve detection performance. However, there may be certain instances in which the radio resources allocated for the signaling observe more interference than normal, and the signaling may be received in error.

There is therefore a need in the art for techniques to transmit signaling in a manner to achieve good detection performance in the presence of interference variations.

SUMMARY

Techniques for transmitting signaling with localized spreading to achieve good detection performance are described herein. In one design, a transmitter (e.g., a base station) may spread multiple signaling symbols to obtain multiple sets of output symbols. The multiple signaling symbols may comprise acknowledgement (ACK) symbols and/or other types of signaling symbols. The transmitter may obtain each set of output symbols by spreading the multiple signaling symbols with a spreading matrix. The transmitter may then map the multiple sets of output symbols to multiple time frequency blocks, one set of output symbols to each time frequency block. The spreading may thus be localized to each time frequency block. A receiver (e.g., a terminal) may perform the complementary despreading to recover one or more signaling symbols of interest.

In another design, a transmitter may scale multiple signaling symbols (which may be intended for different receivers) with multiple gains determined based on the transmit power for these signaling symbols. The transmitter may scramble each scaled signaling symbol with a respective scrambling sequence to obtain multiple scrambled symbols for that signaling symbol. The transmitter may form multiple sets of scrambled symbols, with each set including one scrambled symbol for each of the multiple signaling symbols. The transmitter may spread each set of scrambled symbols with a spreading matrix to obtain a corresponding set of output symbols. The transmitter may then map each set of output symbols to a respective time frequency block. A receiver may perform the complementary despreading to recover one or more signaling symbols of interest.

Various aspects and features of the disclosure are described in further detail below.

BRIEF DESCRIPTION OF THE DRAWINGS

FIGS. 9 and 10 show a process and an apparatus, respectively, for transmitting signaling with localized spreading.

FIGS. 11 and 12 show another process and another apparatus, respectively, for transmitting signaling with localized spreading.

DETAILED DESCRIPTION

Figure 1:
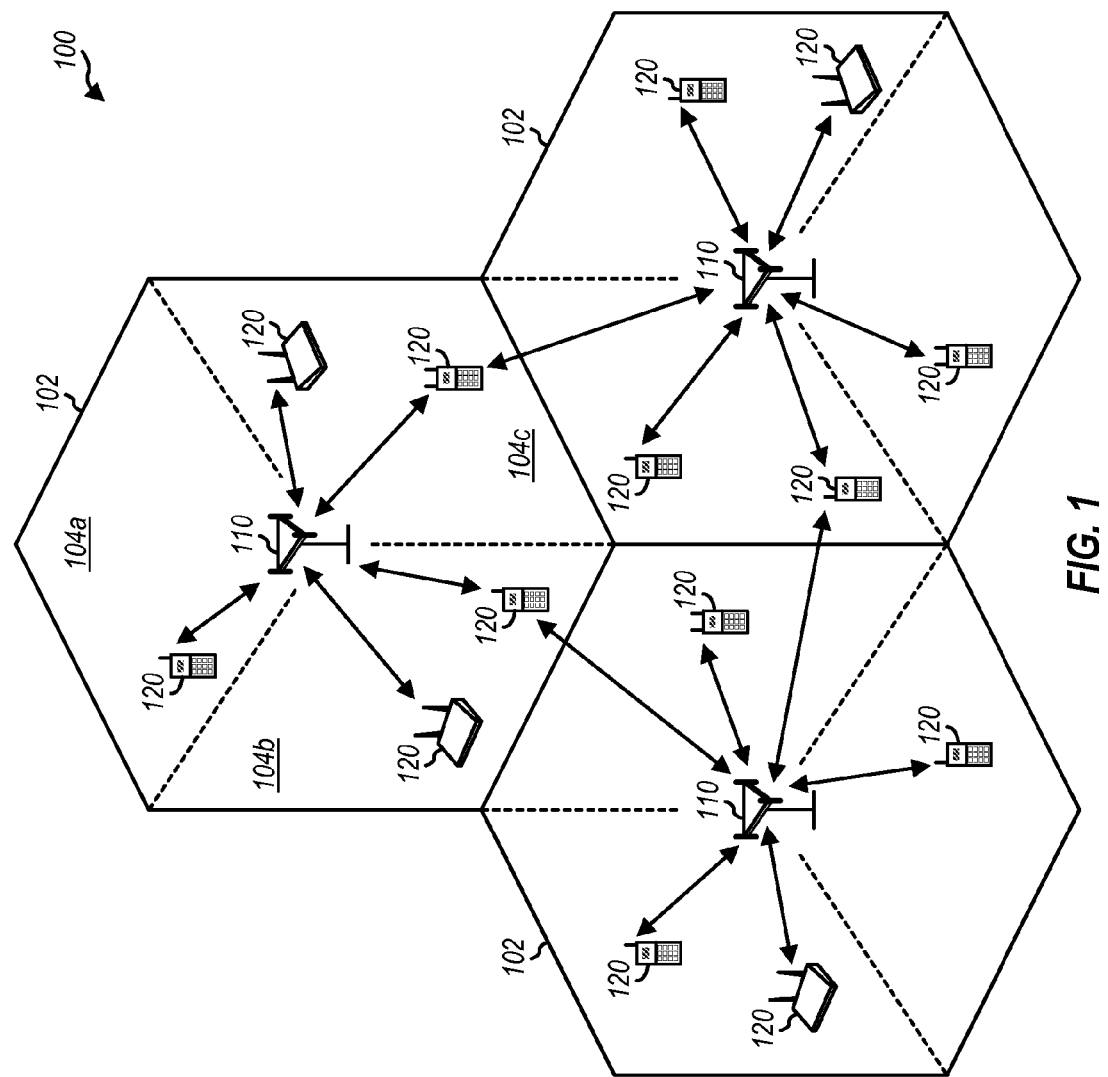
FIG. 1 shows a wireless communication system.

FIG. 1 shows a wireless communication system 100 with multiple base stations 110 and multiple terminals 120. A base station is a station that communicates with the terminals. A base station may also be referred to as an access point, a Node B, an evolved Node B, etc. Each base station 110 provides communication coverage for a particular geographic area 102. The term "cell" can refer to a base station and/or its coverage area depending on the context in which the term is used. To improve system capacity, a base station coverage area may be partitioned into multiple smaller areas, e.g., three smaller areas 104a, 104b and 104c. Each smaller area may be served by a respective base station subsystem. The term "sector" can refer to the smallest coverage area of a base station and/or the subsystem serving this coverage area.

Terminals 120 may be dispersed throughout the system, and each terminal may be stationary or mobile. A terminal may also be referred to as an access terminal, a mobile station, a user equipment, a subscriber unit, a station, etc. A terminal may be a cellular phone, a personal digital assistant (PDA), a wireless device, a wireless modem, a handheld device, a laptop computer, etc. A terminal may communicate with zero, one, or multiple base stations on the forward and/or reverse link at any given moment. The forward link (or downlink)

refers to the communication link from the base stations to the terminals, and the reverse link (or uplink) refers to the communication link from the terminals to the base stations. The terms "terminal" and "user" are used interchangeably herein.

The techniques described herein may be used for various wireless communication systems such as CDMA, TDMA, FDMA, OFDMA and SC-FDMA systems. A CDMA system utilizes code division multiplexing (CDM) and sends transmissions with different orthogonal codes. A TDMA system utilizes time division multiplexing (TDM) and sends transmissions in different time slots. An FDMA system utilizes frequency division multiplexing (FDM) and sends transmissions on different subcarriers. An OFDMA utilizes orthogonal frequency division multiplexing (OFDM), and an SC-FDMA system utilizes single-carrier frequency division multiplexing (SC-FDM). OFDM and SC-FDM partition the system bandwidth into multiple orthogonal subcarriers, which are also referred to as tones, bins, etc. Each subcarrier may be modulated with data. In general, modulation symbols are sent in the frequency domain with OFDM and in the time domain with SC-FDM. The techniques may also be used for wireless communication systems that utilize a combination of multiplexing schemes, e.g., CDMA and OFDM, or OFDM and SC-FDM, etc. For clarity, certain aspects of the techniques are described below for a system utilizing OFDM on the forward link. Certain aspects of the techniques are also described in detail for a system implementing Ultra Mobile Broadband (UMB) radio technology described in 3GPP2 C.S0084-001-0, entitled "Physical Layer for Ultra Mobile Broadband (UMB) Air Interface Specification," dated May 18, 2007, which is publicly available.

The techniques described herein may also be used for various types of signaling. For example, the techniques may be used for acknowledgments (ACKs) and negative acknowledgment (NAKs) for packets, power control commands, etc. For clarity, certain aspects of the techniques are described below for ACK/NAK signaling.

Figure 2:
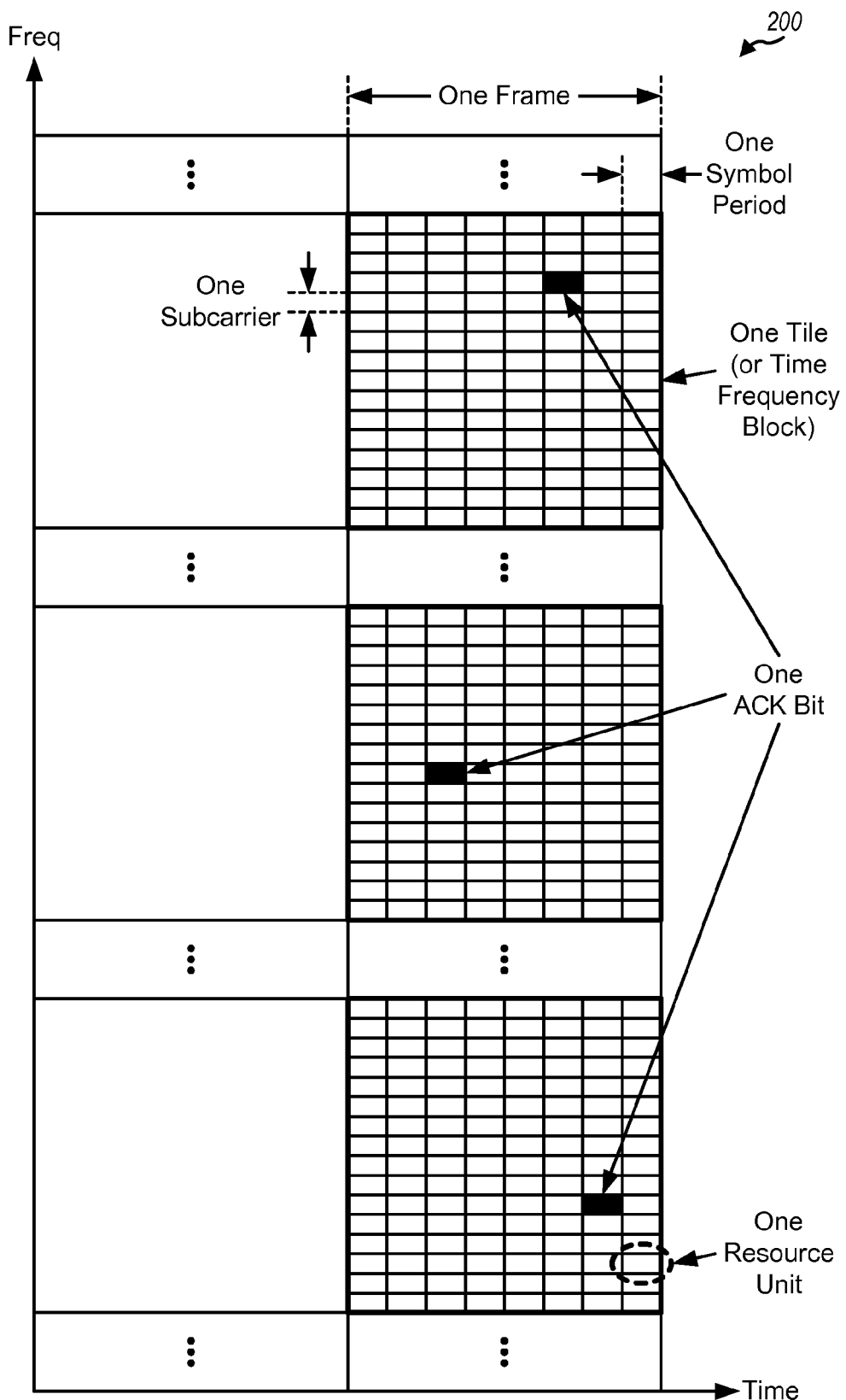
FIG. 2 shows an example transmission structure.

FIG. 2 shows a design of a transmission structure 200 that may be used for the forward link. The transmission timeline may be partitioned into frames, which may also be referred to as physical layer (PHY) frames, time slots, etc. Each frame may span a particular time duration, which may be fixed or configurable. Each frame may span T symbol periods, where in general $T \geq 1$ and in one design $T=8$. A symbol period is the duration of one OFDM symbol.

The system bandwidth may be partitioned into multiple (K) orthogonal subcarriers. All K total subcarriers may be usable for transmission. Alternatively, only a subset of the K total subcarriers may be usable for transmission, and the remaining subcarriers may serve as guard subcarriers to allow the system to meet spectral mask requirements. In one design, the spacing between subcarriers is fixed, and the number of subcarriers (K) is dependent on the system bandwidth. In one design, K may be equal to 128, 256, 512, 1024 or 2048 for system bandwidth of 1.25, 2.5, 5.0, 10 or 20 MHz, respectively.

The available time and frequency resources for the forward link may be partitioned into tiles, which may also be referred to as time frequency blocks, resource blocks, etc. A tile may cover S subcarriers in T symbol periods, where in general $S \geq 1$ and $T \geq 1$. In one design, a tile covers 16 subcarriers in 8 symbol periods. A tile may also have other S×T dimensions in other designs. The S subcarriers in a tile may be consecutive subcarriers or may be distributed across the system bandwidth. A tile includes S·T resource units that may be used to send up to S·T symbols. A resource unit is one subcarrier in one symbol period and may also be referred to as a resource element, a subcarrier-symbol, etc. For a given tile, some resource units may be used for pilot symbols and remaining resource units may be used for data and/or signaling symbols. As used herein, a data symbol is a symbol for traffic data, a signaling symbol is a symbol for signaling, a pilot symbol is a symbol for pilot, and a symbol is a complex value. Pilot is data that this known a priori by both a transmitter and a receiver.

One or more signaling channels may be defined and may be allocated a sufficient number of tiles. For example, a Forward Link Control Segment (FLCS) may be defined and may comprise a number of signaling/control channels such as a Forward Acknowledgement Channel (F-ACKCH). The FLCS may be allocated tiles distributed across time and frequency in order to achieve diversity. Different control channels may be allocated different resource units in the tiles allocated to the FLCS. Signaling for each control channel may be sent on the resource units allocated to that control channel.

A control channel such as the F-ACKCH may carry one signaling symbol or one information bit for a user in a given transmission. An information bit may have one of two possible values (e.g., 0 and 1) whereas a signaling symbol may have one of two or more possible real or complex values. In order to ensure diversity and improve reliability, the signaling symbol or information bit may be repeated and sent on multiple resource units, which may be distributed across a number of subcarriers and/or symbol periods.

FIG. 2 shows an example transmission of an ACK bit for one user. In this example, the ACK bit is repeated and sent on three resource units in three tiles of the FLCS. Sending the ACK bit across frequency may provide frequency diversity.

The resource units used for an ACK bit may observe intra-tile interference variations, which are variations in interference within a tile. The intra-tile interference variations may correspond to the interference power on pilot symbols in a tile not being the same as the interference power on other symbols in the tile. The intra-tile interference variations may result from high power control channels in neighboring sectors and may degrade performance.

To mitigate intra-tile interference variations, an ACK bit may be spread and sent across more resource units, which may provide more averaging of the interference variations. To maintain the same overhead (e.g., three resource units per ACK bit for the example shown in FIG. 2), multiple ACK bits may be jointly spread with a spreading matrix to obtain output symbols, which may be sent on resource units.

Figure 3:
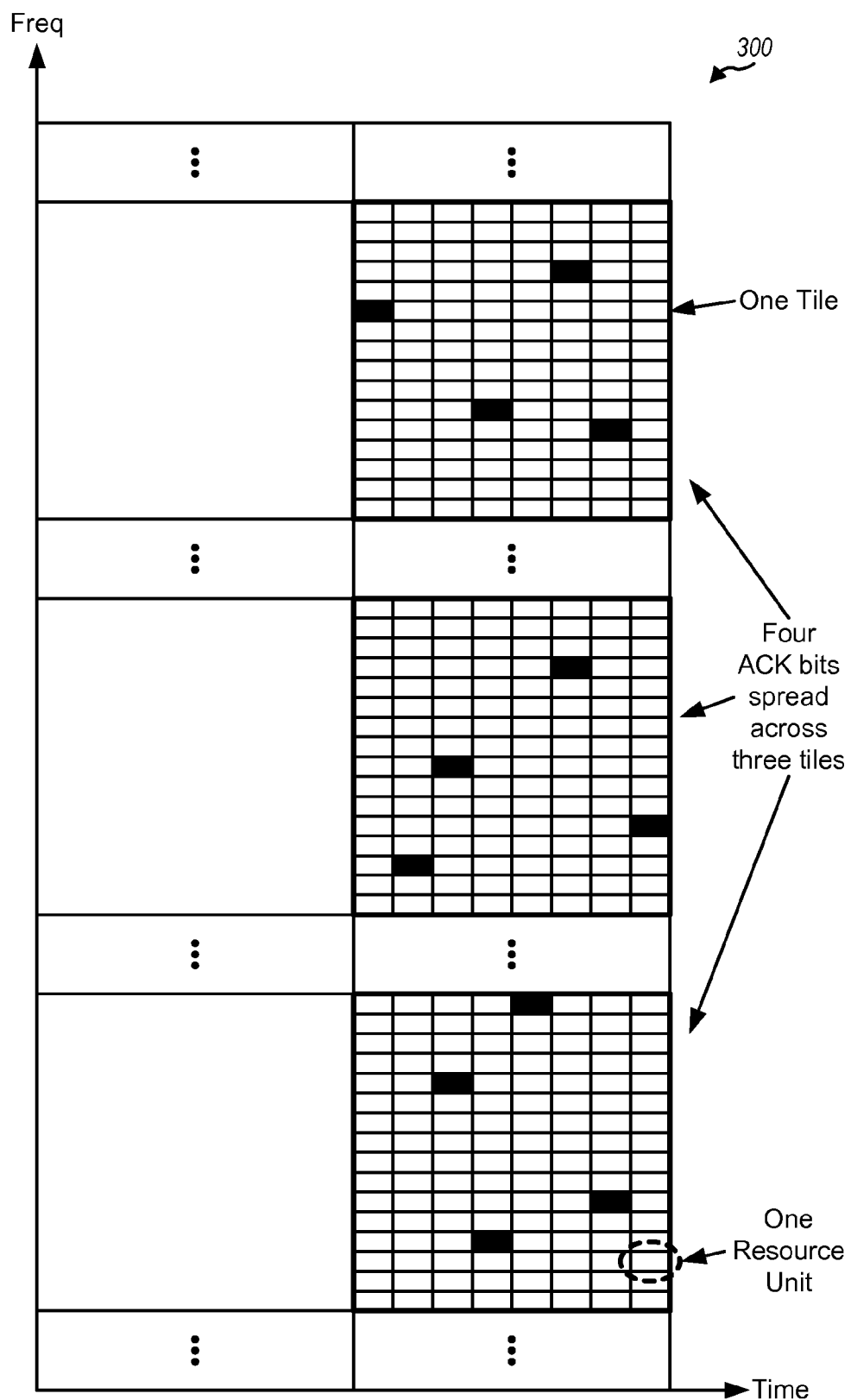
FIG. 3 shows an example transmission of four ACK bits.

FIG. 3 shows a design of transmission of a vector of four ACK bits, which may be for four different users or for four packets from one or more users. In this design, the four ACK bits may be spread with a 12×4 spreading matrix to obtain 12 output symbols, which may be sent on 12 resource units. In the design shown in FIG. 3, the first four output symbols may be send on four resource units in a first tile, the second four output symbols may be sent in a second tile, and the last four output symbols may be sent in a third tile. Each ACK bit may then be sent across 12 resource units and may thus be less prone to performance degradation due to intra-tile interference variations.

In general, a transmitter may spread any number of (L) signaling symbols and obtain any number of (Q) output symbols. In one design, Q is an integer multiple of L, or $Q=L \cdot M$, so that L output symbols may be sent on each of M tiles. A receiver may perform the complementary despreading to recover one or more signaling symbols of interest. The spreading performed by the transmitter and the complementary despreading performed by the receiver may provide averaging of interference variations within a tile. Therefore, the effect of intra-tile interference variations may be mitigated.

The transmitter may perform spreading in a manner to improve detection performance and to simplify processing by the receiver. An arbitrary Q×L spreading matrix may be selected such that each signaling symbol is spread by a different spreading sequence of length Q. In this case, the receiver may perform equalization across all Q resource units used to send Q output symbols in order to account for variations in channel response across these Q resource units. The equalization may be based on minimum mean square error (MMSE), least-squares (LS), or some other techniques. In a highly frequency-selective channel, wide variations in the channel response may result in a large loss of orthogonality among the L spreading sequences in the Q×L spreading matrix. This loss of orthogonality may result in performance degradation even with equalization.

In an aspect, multiple signaling symbols may be spread to combat interference variations. The spreading may be localized to each tile used to send the signaling symbols in order to mitigate performance degradation due to equalization loss and to simplify receiver processing. In one design, the spreading is based on a spreading matrix composed of smaller invertible matrices. In one design, a Q×L overall spreading matrix S may be formed by concatenating M smaller L×L base spreading matrices. M sets of output symbols may be obtained with the M base spreading matrices and may be sent on M different tiles.

In one design, a single type of base spreading matrix is used, and the overall spreading matrix S is composed of M copies of this base spreading matrix. The base spreading matrix may be a discrete Fourier transform (DFT) matrix, a Walsh matrix (which is also referred to as a Hadamard matrix), a unitary matrix, etc. In another design, the overall spreading matrix S may be composed of different types of base spreading matrix. For example, L signaling symbols may be spread with a DFT matrix and sent in one tile, and the same L signaling symbols may be spread with a Walsh matrix and sent in another tile.

Figure 4:
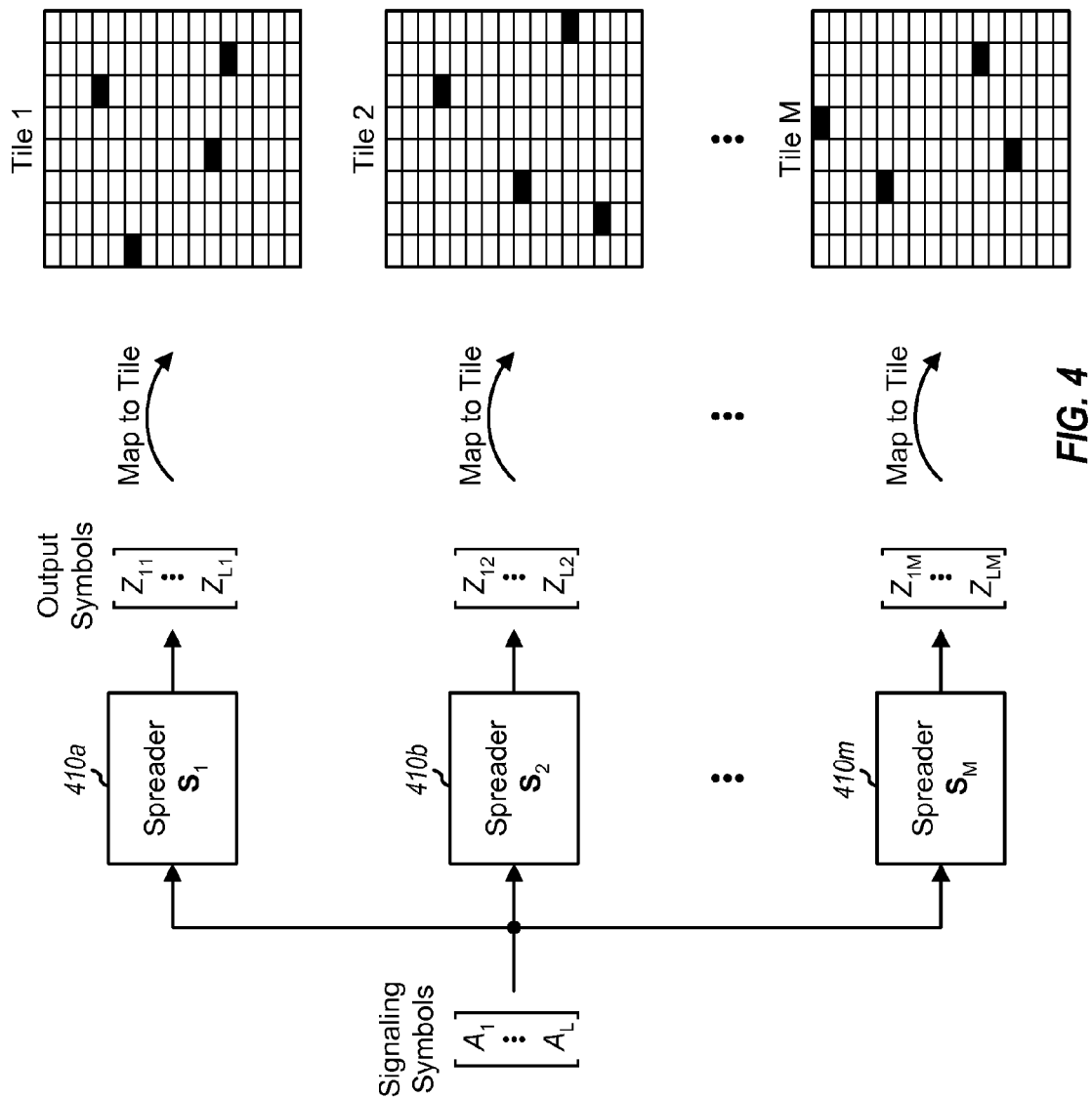
FIG. 4 shows localized spreading for each of multiple tiles.

FIG. 4 shows a design of signaling transmission with localized spreading for each tile. A vector of L signaling symbols, $a=[A_1 \ldots A_L]^T$, may be provided to M spreaders 410a through 410m, where "$T$" denotes a transpose. Each spreader 410 may spread the L signaling symbols with a respective base spreading matrix $S_m$ and provide a vector of L output symbols, $z_m=[Z_{1m} \ldots Z_{Lm}]^T$, where $m \in \{1, \ldots, M\}$. The L output symbols from each spreader 410 may be mapped to L resource units in a respective tile. Each signaling symbol may thus be sent on M·L resource units in M tiles. Each signaling symbol may be spread across L resource units in each tile based on a spreading sequence for the signaling symbol for that tile.

The spreading for the vector of L signaling symbols may be expressed as:

$$\begin{bmatrix} z_1 \\ z_2 \\ \vdots \\ z_M \end{bmatrix} = \begin{bmatrix} S_1 \\ S_2 \\ \vdots \\ S_M \end{bmatrix} a,$$ Eq (1)

where
$S_m$ for $m \in \{1, \ldots, M\}$ is the base spreading matrix for tile m, and
$z_m$ for $m \in \{1, \ldots, M\}$ is the vector of output symbols for tile m.

The base spreading matrix for each tile m may be a unitary matrix having the following property:

$$S_m S_m^H = S_m^H S_m = I,$$ Eq (2)

where "$H$" denotes a conjugate transpose and I is an identity matrix. Equation (2) indicates that the columns of the base spreading matrix are orthogonal to one another, and each column has unit power.

The spreading for each tile m may be expressed as:

$$z_m = S_m a, \text{ for } m \in \{1, \ldots, M\}.$$ Eq (3)

Equation (3) may be expanded as follows:

$$\begin{bmatrix} Z_{1m} \\ Z_{2m} \\ \vdots \\ Z_{Lm} \end{bmatrix} = \begin{bmatrix} S_{11m} & S_{12m} & \cdots & S_{1Lm} \\ S_{21m} & S_{22m} & \cdots & S_{2Lm} \\ \vdots & \vdots & \ddots & \vdots \\ S_{L1m} & S_{L2m} & \cdots & S_{LLm} \end{bmatrix} \begin{bmatrix} A_1 \\ A_2 \\ \vdots \\ A_L \end{bmatrix},$$ Eq (4)

where
$A_l$ for $l \in \{1, \ldots, L\}$ is the l-th signaling symbol in vector a,
$S_{klm}$ is the element in the k-th row and l-th column of spreading matrix $S_m$, and
$Z_{km}$ for $k \in \{1, \ldots, L\}$ is an output symbol for the k-th resource unit of tile m.

With localized spreading, a receiver may obtain L despread symbols for each tile by inverting the base spreading matrix for that tile. The despread symbols are initial estimates of the signaling symbols. For each signaling symbol, M despread symbols may be obtained from M tiles and combined to obtain a final estimate of that signaling symbol. Alternately, the receiver may perform equalization, e.g., based on MMSE or LS. In this case, the loss due to equalization may be dependent on the amount of channel variations within each tile instead of across all M tiles. Hence, the equalization loss may be smaller with localized spreading than for the case in which the spreading is across all M tiles.

Figure 5:
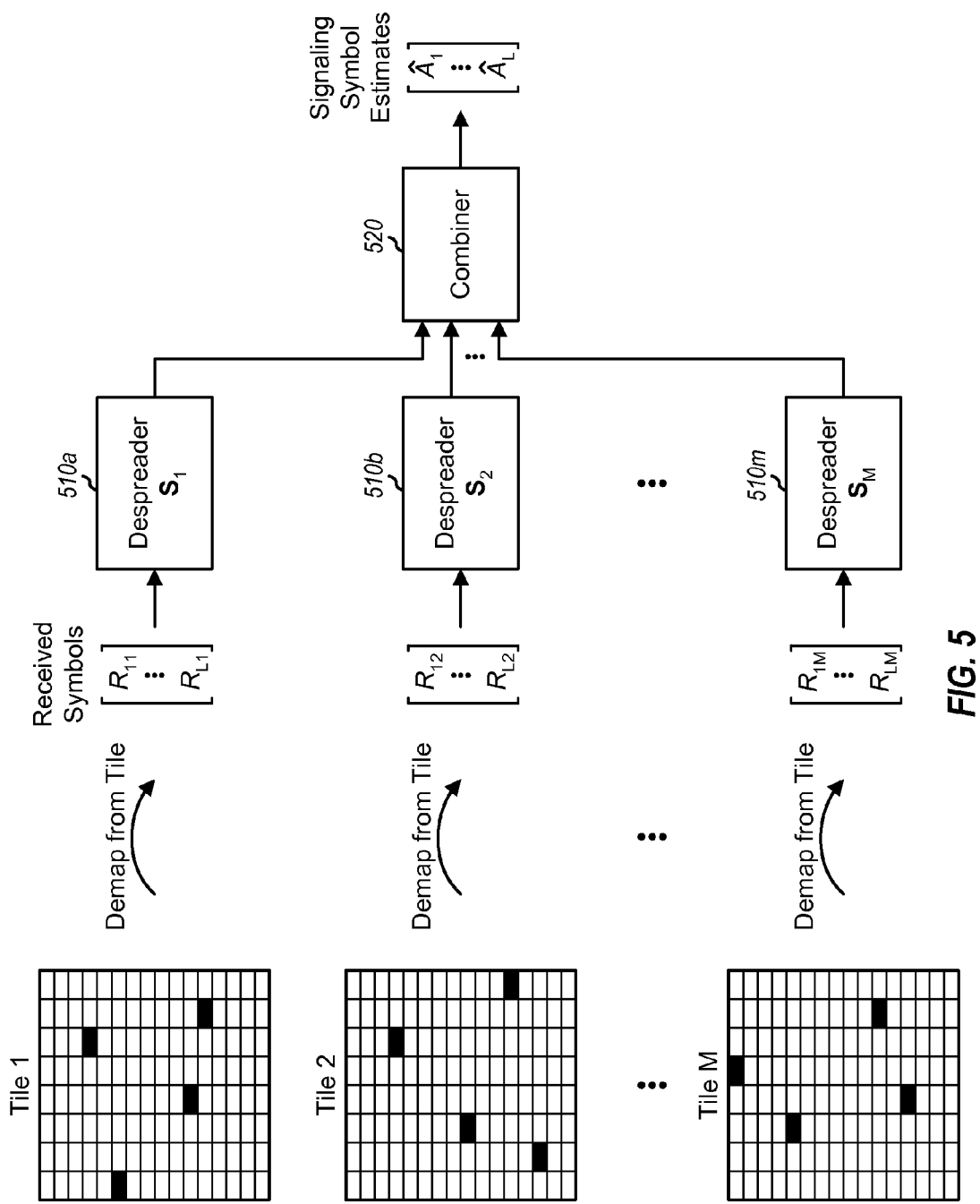
FIG. 5 shows despreading with localized spreading for each tile.

FIG. 5 shows a design of reception of signaling sent with localized spreading for each tile. A vector of L received symbols, $r_m=[R_{1m} \ldots R_{Lm}]^T$, may be obtained from each tile used to send the L signaling symbols. M received symbol vectors $r_1$ through $r_M$ may be obtained from the M tiles and provided to M despreaders 510a through 510m, respectively. Each despreader 510 may despread its received symbol vector $r_m$ based on a respective base spreading matrix $S_m$ and provide a vector $b_m$ of L despread symbols. A combiner 520 may receive M despread symbol vectors $b_1$ through $b_M$ from despreaders 510a through 510m, respectively. Combiner 520 may scale and combine these M despread symbol vectors to obtain a vector of L signaling symbol estimates, $\hat{a}=[\hat{A}_1 \ldots \hat{A}_L]^T$.

The despreading for each tile m may be expressed as:

$$b_m = S_m^{-1} r_m,$$ Eq (5)

where $S_m^{-1}$ is a despreading matrix for tile m, which is the inverse of $S_m$.

The receiver may be interested in only a subset of the L signaling symbols sent by the transmitter. The receiver may then perform despreading for a given signaling symbol $A_l$ for each tile m, as follows:

$$B_{\ell m} = [\, S'_{1\ell m} \quad S'_{2\ell m} \quad \cdots \quad S'_{L\ell m}\,] \begin{bmatrix} R_{1m} \\ R_{2m} \\ \vdots \\ R_{Lm} \end{bmatrix}, \qquad \text{Eq (6)}$$

where $R_{km}$ is the k-th received symbol in vector $r_m$, $S'_{k\ell m}$ is the element in the m-th row and l-th column of despreading matrix $S_m^{-1}$, and $B_{\ell m}$ is the l-th despread symbol in vector $b_m$, which is the despread symbol from tile m for signaling symbol $A_\ell$.

The receiver may perform symbol combining across the M tiles for signaling symbol $A_\ell$ as follows:

$$\hat{A}_\ell = \sum_{m=1}^{M} W_{\ell m} B_{\ell m}, \qquad \text{Eq (7)}$$

where $W_{\ell m}$ is a weight for tile m for signaling symbol $A_\ell$, and $\hat{A}_\ell$ is a final estimate of signaling symbol $A_\ell$.

The weight $W_{\ell m}$ for each tile may be determined based on the received signal quality for that tile. Received signal quality may be quantified by a signal-to-noise ratio (SNR) or some other measure. More weight may be given to despread symbols from tiles with higher received signal quality. Alternatively, the same weight may be applied to the despread symbols from all M tiles.

Figure 6:
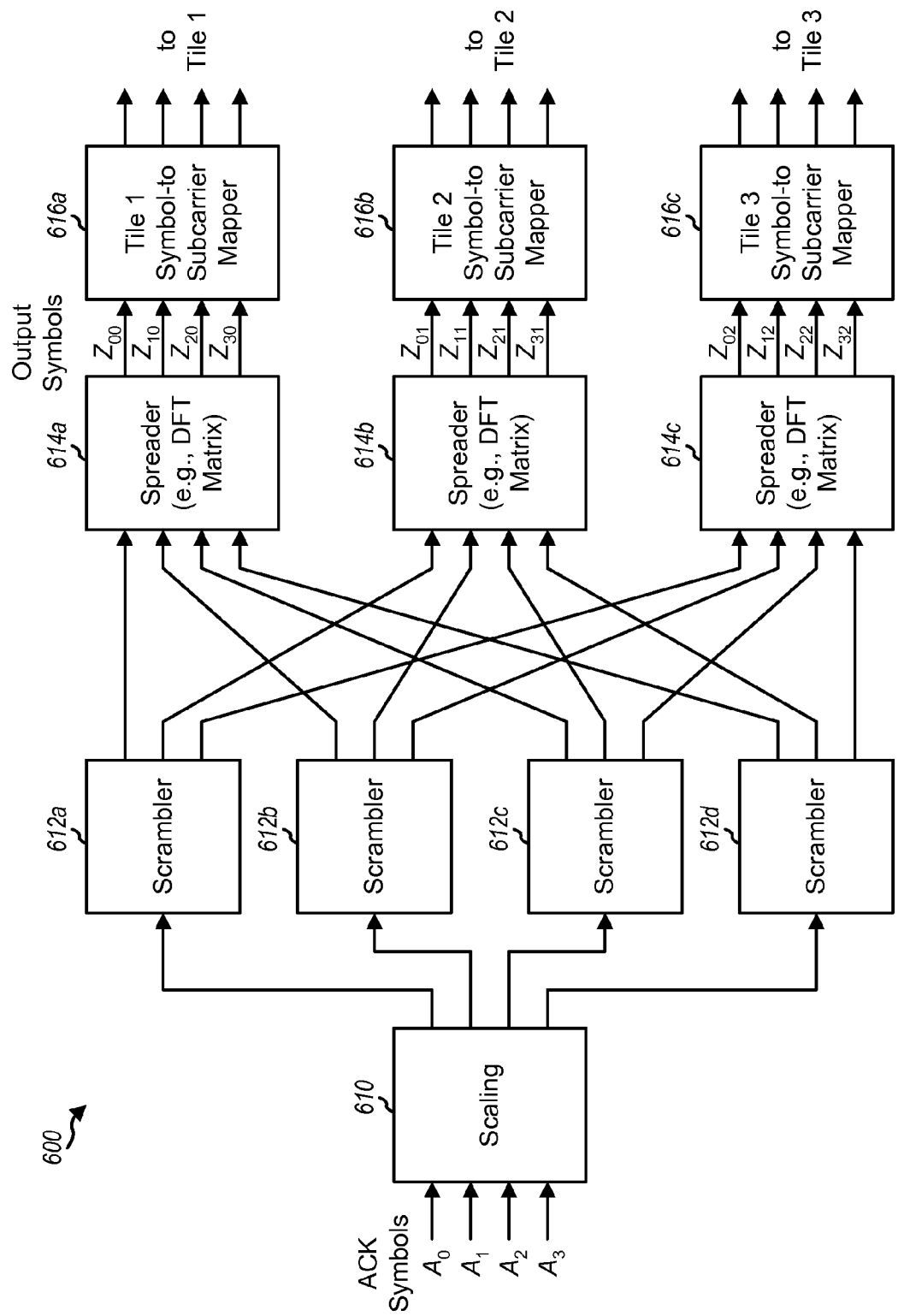
FIG. 6 shows transmission of ACK signaling with localized spreading.

FIG. 6 shows a block diagram of a design of a transmit (TX) signaling processor 600 for sending ACK signaling with localized spreading. In this design, four ACK symbols may be spread and sent in three tiles, with the spreading being localized to each tile.

In one design, an ACK symbol may have one of four possible values, which may be given as:

$$A_\ell = \begin{cases} 0 & \text{for ACK value of 0} \\ e^{j2\pi/3} & \text{for ACK value of 1} \\ e^{j4\pi/3} & \text{for ACK value of 2} \\ e^{j2\pi} & \text{for ACK value of 3.} \end{cases} \qquad \text{Eq (8)}$$

An ACK value of 0 may correspond to a NAK, which may be sent for a packet decoded in error. An ACK value of 1 may indicate a packet decoded correctly and may further inform a user to keep the current resource assignment. An ACK value of 2 may indicate a packet decoded correctly and may further inform the user to relinquish the current resource assignment. An ACK value of 3 may inform the user to relinquish the current resource assignment. An ACK symbol may also be defined to have one of two possible values (e.g., 0 and 1) or based on some other sets of possible values.

A scaling unit 610 may receive and scale the four ACK symbols. The ACK symbols may be sent to different users having different geometries or SNRs. The ACK symbol for each user may be scaled with a suitable gain to achieve a desired SNR for the ACK symbol. Scaling unit 610 may provide four scaled ACK symbols $A'_0$ through $A'_3$ to four scramblers 612a through 612d respectively.

Each scrambler 612 may scramble its scaled ACK symbol $A'_\ell$ with three scrambling values $Y_{\ell 0}$, $Y_{\ell 1}$ and $Y_{\ell 2}$ from a scrambling sequence for the user to which ACK symbol $A_\ell$ is sent.

Different users may be assigned different scrambling sequences, which may be generated based on parameters such as a MAC ID for the user, a sector ID for the transmitting sector, etc. The scrambling may be used to differentiate signals from different sectors to different users with different MAC IDs. Each scrambler 612 may provide three scrambled symbols to three spreaders 614a, 614b and 614c.

Each spreader 614 may receive four scrambled symbols for the four ACK symbols from four scramblers 612a through 612d. Each spreader 614 may spread its four scrambled symbols with a spreading matrix (e.g., a 4×4 DFT matrix) and provide four output symbols. Spreaders 614a, 614b and 614c may provide their output symbols to symbol-to-subcarrier mappers 616a, 616b and 616c, respectively.

Each mapper 616 may map its four output symbols to four resource units in an associated tile. Mapper 616a may map its output symbols to tile 1, mapper 616b may map its output symbols to tile 2, and mapper 616c may map its output symbols to tile 3.

The transmitter processing for each tile may be expressed as:

$$z_m = D Y_m G a, \qquad \text{Eq (9)}$$

where $a = [A_0 \; A_1 \; A_2 \; A_3]^T$ is a 4×1 vector of four ACK symbols,

G is a 4×4 diagonal matrix with four gains along the diagonal for the four ACK symbols and zeros elsewhere, $Y_m$ is a 4×4 diagonal matrix with four scrambling values along the diagonal for the four ACK symbols for tile m, D is a 4×4 DFT matrix used for spreading for one tile, and $z_m = [Z_{0m} \; Z_{1m} \; Z_{2m} \; Z_{3m}]^T$ is a 4×1 vector of output symbols for tile m.

The processing for each ACK symbol $A_\ell$ may be expressed as:

$$Z_{k\ell m} = D_{k\ell} Y_{\ell m} G_\ell A_\ell, \text{ for } k=0,\ldots,3 \text{ and } m=0,\ldots,2, \qquad \text{Eq (10)}$$

where $G_\ell = \sqrt{P_{TX\ell}}$ is the gain and $P_{TX\ell}$ is the transmit power for ACK symbol $A_\ell$, $Y_{\ell m}$ is a scrambling value for ACK symbol $A_\ell$ for tile m, $D_{k\ell}$ is the element in the k-th row and l-th column of DFT matrix D, and $Z_{k\ell m}$ is an output symbol for ACK symbol $A_\ell$ for the k-th resource unit in tile m.

Equation (10) indicates that ACK symbol $A_\ell$ may be scaled with gain $G_\ell$ to achieve the desired transmit power for ACK symbol $A_\ell$. The scaled ACK symbol may then be scrambled with three scrambling values to obtain three scrambled symbols. Each scrambled symbol may be spread by four elements in a column of the DFT matrix to obtain four output symbols to be sent in one tile for that scrambled symbol. A total of 12 output symbols may be obtained for ACK symbol $A_\ell$.

The output symbols for all four ACK symbols may be combined as follows:

$$Z_{km} = \sum_{\ell=0}^{3} Z_{k\ell m}, \qquad \text{Eq (11)}$$

where $Z_{km}$ is an output symbol to be sent on the k-th resource unit in tile m.

Figure 7:
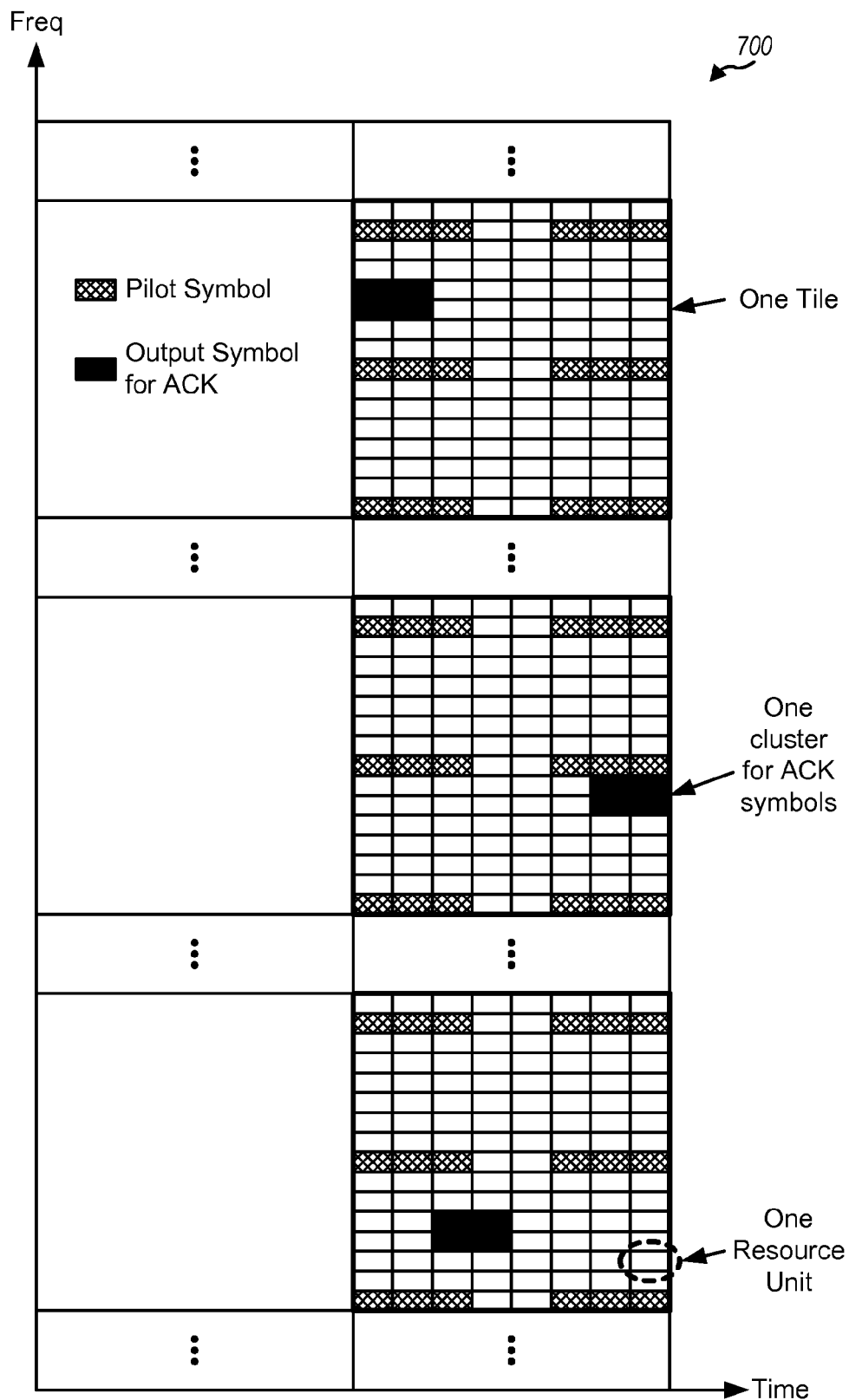
FIG. 7 shows mapping of output symbols for ACK signaling to three tiles.

FIG. 7 shows a design of transmitting 12 output symbols for four ACK symbols in three tiles. In this design, each tile covers 16 subcarriers in 8 symbol periods. In each tile, 18 resource units are reserved for pilot symbols, and the remaining resource units may be used to send other symbols. In one design, four output symbols $Z_{0m}$, $Z_{1m}$, $Z_{2m}$ and $Z_{3m}$ are mapped to a cluster of four adjacent resource units in tile m. Sending the four output symbols close together in frequency and time may result in these output symbols observing less channel variations, which may in turn result in less loss of orthogonality. The output symbols may be mapped to different symbol periods in the three tiles, as shown in FIG. 7. This may allow for better transmit power sharing among the symbols sent on different subcarriers. Transmitting the output symbols on multiple clusters in the same pair of symbol periods may result in too much transmit power being used for these output symbols and less transmit power being available for remaining symbols in that pair of symbol periods. The output symbols may also be mapped to resource units in other manners.

Figure 8:
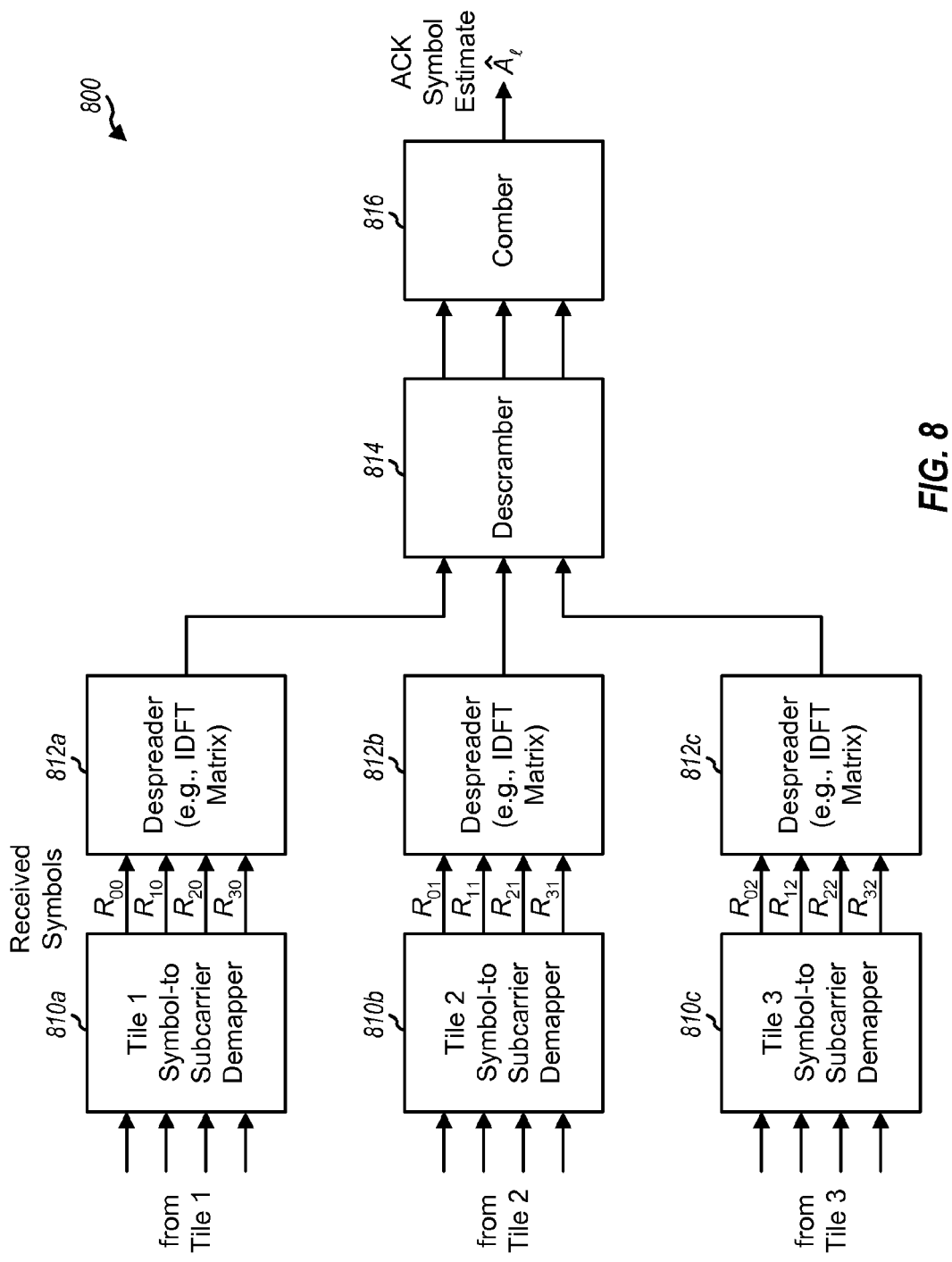
FIG. 8 shows reception of ACK signaling sent with localized spreading.

FIG. 8 shows a block diagram of a design of a receive (RX) signaling processor 800 for receiving ACK signaling sent with localized spreading. For clarity, FIG. 8 shows the processing to recover one ACK symbol $A_l$.

Symbol-to-subcarrier demappers 810a, 810b and 810c may obtain received symbols from the three tiles used to send the ACK signaling. Each demapper 810 may provide four received symbols from the four resource units used to send the ACK signaling in the associated tile. Despreaders 812a, 812b and 812c may obtain the received symbols from demappers 810a, 810b and 810c, respectively. The four ACK symbols may be spread with four columns of the DFT matrix. Each despreader 812 may then despread its four received symbols with four elements in the %-th column of an inverse DFT (IDFT) matrix, which corresponds to the l-th column of the DFT matrix used to spread ACK symbol $A_l$ being recovered. A descrambler 814 may receive three despread symbols $B_{l0}$, $B_{l1}$ and $B_{l2}$ from despreaders 812a, 812b and 812c, respectively. Descrambler 814 may multiply the three despread symbols with the three scrambling value $Y_{l0}$, $Y_{l1}$ and $Y_{l2}$ for ACK symbol A and provide three descrambled symbols. A combiner 816 may scale the three descrambled symbols with three weights derived for the three tiles and may then combine the three scaled symbols, e.g., as shown in equation (7), to obtain an ACK symbol estimate $\hat{A}_l$. The receiver processing may be repeated for each ACK symbol of interest. ACK symbol $A_l$ may also be recovered by performing equalization (e.g., based on MMSE or LS) and descrambling.

In general, any gain value $G_l$ may be used for each ACK symbol $A_l$. For a flat-fading channel, the four spread ACK symbols remain orthogonal at the receiver, and each ACK symbol may be recovered by despreading the received symbols. For a frequency-selective channel, channel variations may result in loss of orthogonality, which may then result in each ACK symbol causing interference to the remaining ACK symbols. An ACK symbol transmitted with high power may cause excessive interference to an ACK symbol transmitted with low power, which may then degrade detection performance for the low power ACK symbol. To mitigate this effect, the ratio of the highest gain to the lowest gain among the four gains for the four ACK symbols may be limited to a threshold value or lower. This may then ensure that the highest power ACK symbol does not cause excessive interference to the lowest power ACK symbol. The threshold value may be selected based on various factors such as the expected maximum amount of loss in orthogonality due to channel variations, the desired detection performance, etc. ACK symbols for different users may also be arranged into groups such that each group includes ACK symbols with similar transmit power.

The processing shown in FIGS. 6 and 8 may also be performed in other manners or orders. For example, scrambling may be performed prior to spreading (as shown in FIG. 6) or after spreading. The scaling may be performed first (as shown in FIG. 6), or after scrambling, or at some other point. The scaling and/or scrambling may also be omitted.

For clarity, the use of the techniques for ACK signaling has been described above. The techniques may also be used for other types of signaling. For example, the techniques may be used for power control commands, other-sector-interference (OSI) indications, access grants, resource assignments, pilot quality indicators, start of packet indications, reverse activity bits, etc.

FIG. 9 shows a design of a process 900 for transmitting signaling with localized spreading. Process 900 may be performed by a transmitter such as a base station, etc. Multiple signaling symbols may be spread to obtain multiple sets of output symbols, with each set of output symbols being obtained by spreading the multiple signaling symbols with a spreading matrix, e.g., a DFT matrix or a Walsh matrix (block 912). The multiple sets of output symbols may be mapped to multiple time frequency blocks or tiles (block 914). For example, each set of output symbols may be mapped to a cluster of adjacent resource units in one time frequency block. The multiple signaling symbols may comprise ACK symbols and/or other types of signaling symbols.

FIG. 10 shows a design of an apparatus 1000 for transmitting signaling with localized spreading. Apparatus 1000 includes means for spreading multiple signaling symbols to obtain multiple sets of output symbols, with each set of output symbols being obtained by spreading the multiple signaling symbols with a spreading matrix (module 1012), and means for mapping the multiple sets of output symbols to multiple time frequency blocks (module 1014).

FIG. 11 shows a design of a process 1100 for transmitting signaling with localized spreading. Process 1100 may be performed by a transmitter such as a base station, etc. Multiple signaling symbols (e.g., ACK symbols) may be scaled with multiple gains determined based on transmit power for these signaling symbols (block 1112). The ratio of the largest gain to the smallest gain may be limited to less than a predetermined value. Each of the multiple scaled signaling symbols may be scrambled with a respective scrambling sequence to obtain multiple scrambled symbols for that signaling symbol (block 1114). Multiple sets of scrambled symbols may be formed, with each set including one scrambled symbol for each of the multiple signaling symbols (block 1116). The multiple sets of scrambled symbols may be spread (e.g., with a DFT matrix or a Walsh matrix) to obtain multiple sets of output symbols, one set of output symbols for each set of scrambled symbols (block 1118). The multiple sets of output symbols may be mapped to multiple time frequency blocks, one set of output symbols to each time frequency block (block 1120). Each set of output symbols may be mapped to a cluster of adjacent resource units in one time frequency block.

The processing in FIG. 11 may also be performed in other orders. Some of the processing (e.g., the scaling and/or scrambling) may be omitted. Other processing may also be performed on the signaling symbols.

FIG. 12 shows a design of an apparatus 1200 for transmitting signaling with localized spreading. Apparatus 1200 includes means for scaling multiple signaling symbols with multiple gains determined based on transmit power for these signaling symbols (module 1212), means for scrambling each of the multiple scaled signaling symbols with a respective scrambling sequence to obtain multiple scrambled symbols for that signaling symbol (module 1214), means for forming multiple sets of scrambled symbols, with each set including one scrambled symbol for each of the multiple signaling symbols (module 1216), means for spreading the multiple sets of scrambled symbols to obtain multiple sets of output symbols, one set of output symbols for each set of scrambled symbols (module 1218), and means for mapping the multiple sets of output symbols to multiple time frequency blocks, one set of output symbols to each time frequency block (module 1220).

Figure 13:
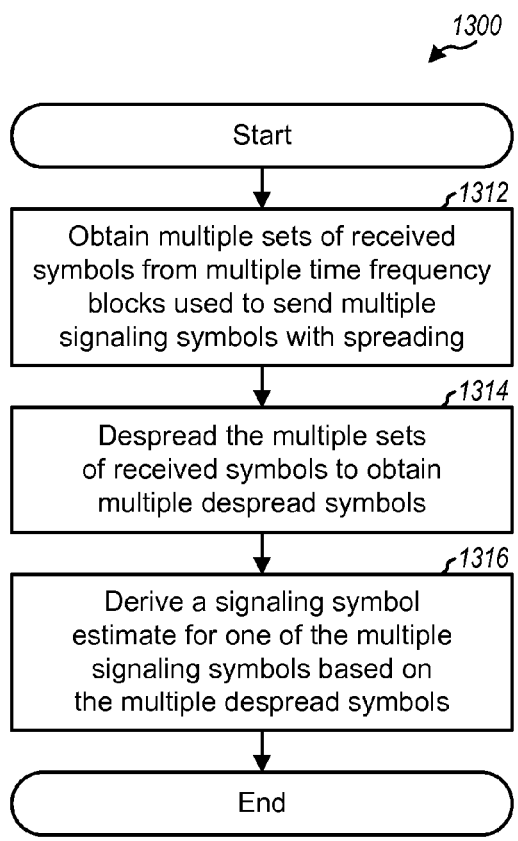
FIGS. 13 and 14 show a process and an apparatus, respectively, for receiving signaling sent with localized spreading.

FIG. 13 shows a design of a process 1300 for receiving signaling. Process 1300 may be performed by a receiver such as a terminal, etc. Multiple sets of received symbols may be obtained from multiple time frequency blocks used to send multiple signaling symbols (e.g., ACK symbols) with spreading (block 1312). The multiple sets of received symbols may be despread (e.g., based on a despreading matrix such as an IDFT matrix or a Walsh matrix) to obtain multiple despread symbols (block 1314). A signaling symbol estimate for one of the multiple signaling symbols may be derived based on the multiple despread symbols (block 1316). The processing may be repeated for each signaling symbol of interest.

Figure 14:
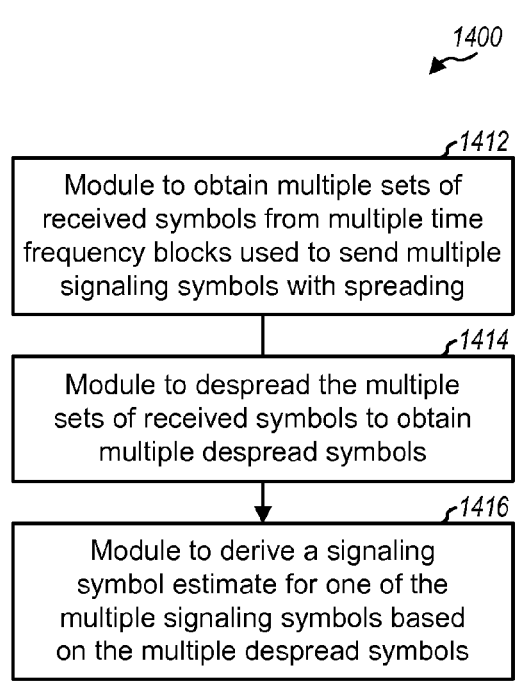

FIG. 14 shows a design of an apparatus 1400 for receiving signaling sent with spreading. Apparatus 1400 includes means for obtaining multiple sets of received symbols from multiple time frequency blocks used to send multiple signaling symbols with spreading (module 1412), means for despreading the multiple sets of received symbols to obtain multiple despread symbols (module 1414), and means for deriving a signaling symbol estimate for one of the multiple signaling symbols based on the multiple despread symbols (module 1416).

Figures 15, 16:
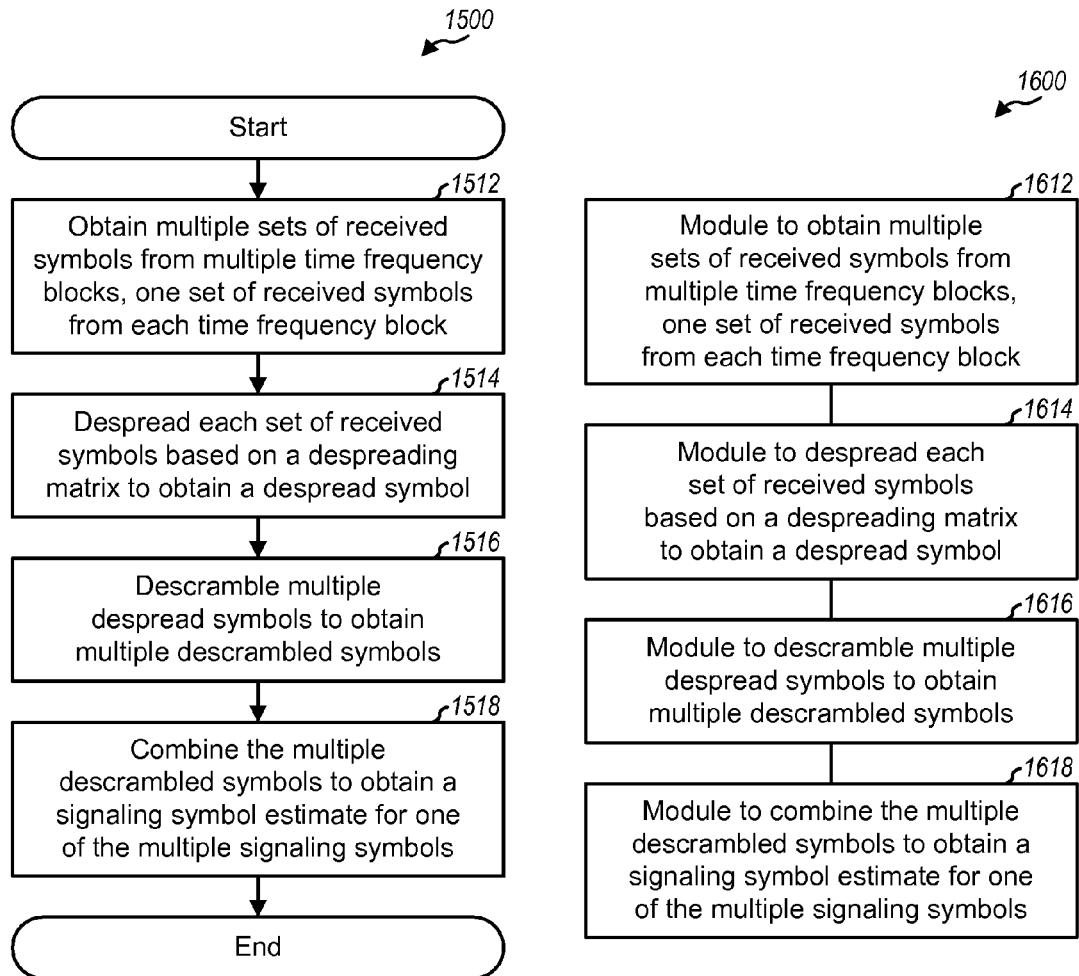
FIGS. 15 and 16 show another process and another apparatus, respectively, for receiving signaling sent with localized spreading.

FIG. 15 shows a design of a process 1500 for receiving signaling. Process 1500 may be performed by a receiver such as a terminal, etc. Multiple sets of received symbols may be obtained from multiple time frequency blocks, one set of received symbols from each time frequency block (block 1512). Each set of received symbols may be despread based on a despreading matrix to obtain a despread symbol (block 1514). Multiple despread symbols may be obtained for the multiple sets of received symbols and may be descrambled to obtain multiple descrambled symbols (block 1516). The multiple descrambled symbols may be combined to obtain a signaling symbol estimate for one of the multiple signaling symbols (block 1518). For block 1518, multiple weights for the multiple time frequency blocks may be determined, e.g., based on received signal qualities for these time frequency blocks. The multiple descrambled symbols may be scaled with the multiple weights to obtain multiple scaled symbols. The multiple scaled symbols may then be combined to obtain the signaling symbol estimate. The processing by the receiver may be dependent on the processing by the transmitter.

FIG. 16 shows a design of an apparatus 1600 for receiving signaling sent with localized spreading. Apparatus 1600 includes means for obtaining multiple sets of received symbols from multiple time frequency blocks, one set of received symbols from each time frequency block (module 1612), means for despreading each set of received symbols based on a despreading matrix to obtain a despread symbol (module 1614), means for descrambling multiple despread symbols to obtain multiple descrambled symbols (module 1616), and means for combining the multiple descrambled symbols to obtain a signaling symbol estimate for one of the multiple signaling symbols (module 1618).

The modules in FIGS. 10, 12, 14 and 16 may comprise processors, electronics devices, hardware devices, electronics components, logical circuits, memories, etc., or any combination thereof.

Figure 17:
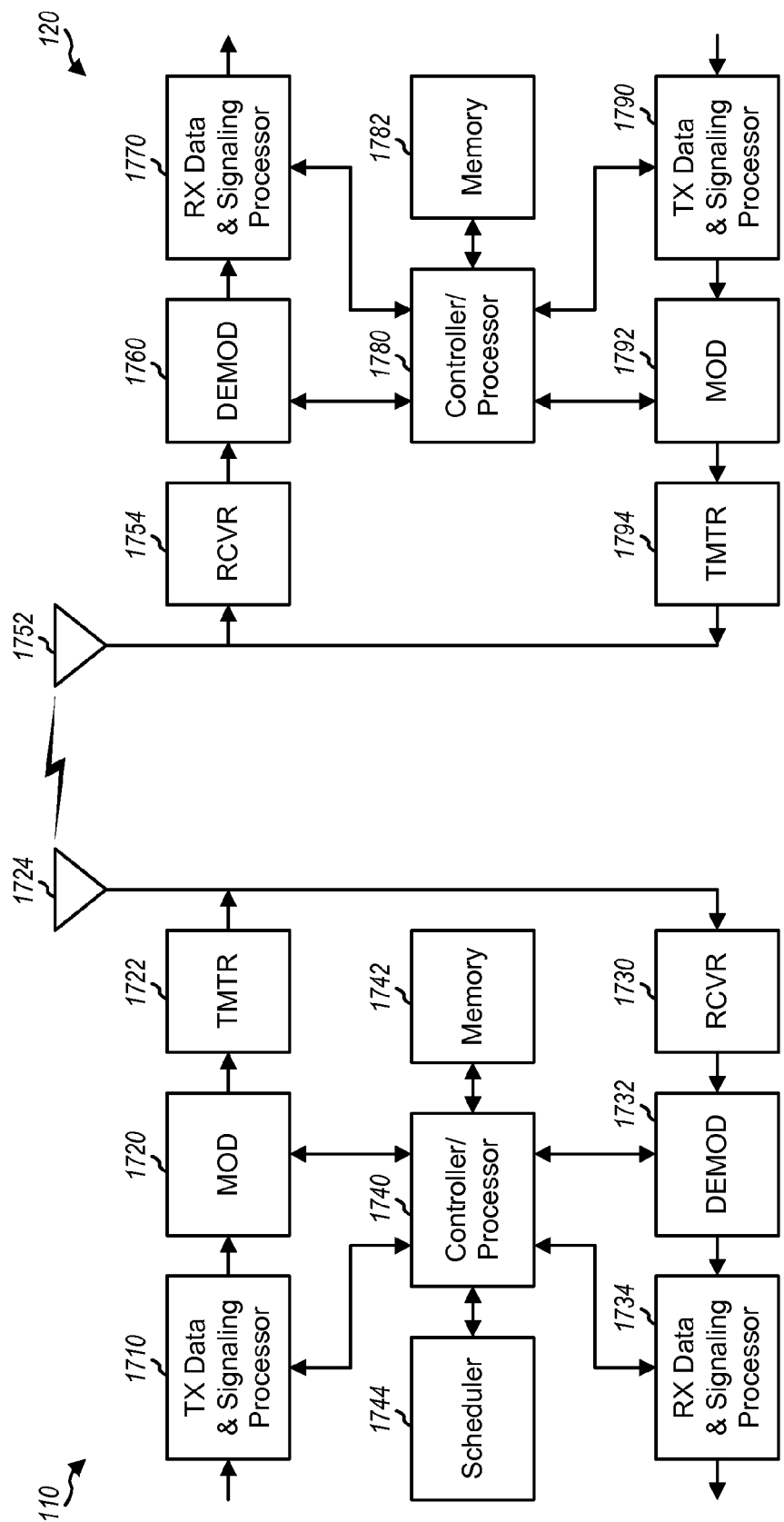
FIG. 17 shows a block diagram of a base station and a terminal.

FIG. 17 shows a block diagram of a design of a base station 110 and a terminal 120, which are one of the base stations and one of the terminals in FIG. 1. At base station 110, a TX data and signaling processor 1710 may receive traffic data from a data source (not shown) and/or signaling from a controller/processor 1740. Processor 1710 may process (e.g., format, encode, interleave, and symbol map) the traffic data and signaling and provide data and signaling symbols. Processor 1710 may also generate pilot symbols. A modulator (MOD) 1720 may process the data, signaling and pilot symbols (e.g., for OFDM) and provide output chips. A transmitter (TMTR) 1722 may process (e.g., convert to analog, amplify, filter, and frequency upconvert) the output chips and generate a forward link signal, which may be transmitted via an antenna 1724.

At terminal 120, an antenna 1752 may receive forward link signals from base station 110 and other base stations and may provide a received signal to a receiver (RCVR) 1754. Receiver 1754 may condition (e.g., filter, amplify, frequency downconvert, and digitize) the received signal and provide received samples. A demodulator (DEMOD) 1760 may perform demodulation on the received samples (e.g., for OFDM) and provide received symbols. An RX data and signaling processor 1770 may process (e.g., symbol demap, deinterleave, and decode) the received symbols to obtain decoded data and signaling sent to terminal 120.

On the reverse link, at terminal 120, traffic data and signaling to be sent by terminal 120 may be processed by a TX data and signaling processor 1790, modulated by a modulator 1792, conditioned by a transmitter 1794, and transmitted via antenna 1752. At base station 110, reverse link signals from terminal 120 and possibly other terminals may be received by antenna 1724, conditioned by a receiver 1730, demodulated by a demodulator 1732, and processed by an RX data and signaling processor 1734 to recover the traffic data and signaling sent by the terminals. The processing for reverse link transmission may be similar to or different from the processing for forward link transmission.

Controllers/processors 1740 and 1780 may direct the operation at base station 110 and terminal 120, respectively. Memories 1742 and 1782 may store data and program codes for base station 110 and terminal 120, respectively. A scheduler 1744 may schedule terminals for forward and/or reverse link transmission and may provide assignments of resources (e.g., tiles) for the scheduled UEs.

For signaling transmission, processor 1710 and/or 1790 may perform the processing shown in FIG. 4 or 6, process 900 in FIG. 9, process 1100 in FIG. 11 and/or other processes for the techniques described herein. For signaling reception, processor 1734 and/or 1770 may perform the processing shown in FIG. 5 or 8, process 1300 in FIG. 13, process 1500 in FIG. 15 and/or other processes for the techniques described herein.

The techniques described herein may be implemented by various means. For example, these techniques may be implemented in hardware, firmware, software, or a combination thereof. For a hardware implementation, the processing units used to perform the techniques at an entity (e.g., a base station or a terminal) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein.

The firmware and/or software instructions/code may be stored in a memory (e.g., memory 1742 or 1782 in FIG. 17) and executed by a processor (e.g., processor 1740 or 1780). The memory may be implemented within the processor or external to the processor. The firmware and/or software instructions/code may also be stored in a computer/processor-readable medium such as random access memory (RAM), read-only memory (ROM), non-volatile random access memory (NVRAM), programmable read-only memory (PROM), electrically erasable PROM (EEPROM), FLASH memory, floppy disk, compact disc (CD), digital versatile disc (DVD), magnetic or optical data storage device, etc. The instructions/code may be executable by one or more processors and may cause the processor(s) to perform certain aspects of the functionality described herein.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
at least one processor configured to process multiple signaling symbols based on a first spreading matrix to obtain a first set of output symbols, to process the multiple signaling symbols based on the first spreading matrix or a second spreading matrix to obtain a second set of output symbols, to map the first set of output symbols to a first time frequency block, and to map the second set of output symbols to a second time frequency block, each of the first and second time frequency blocks covering multiple subcarriers in multiple symbol periods, and each of the multiple signaling symbols being sent in both the first and second time frequency blocks; and
a memory coupled to the at least one processor.

2. The apparatus of claim 1, wherein the first spreading matrix comprises a discrete Fourier transform (DFT) matrix or a Walsh matrix.

3. The apparatus of claim 1, wherein the at least one processor is configured to scramble the multiple signaling symbols to obtain scrambled symbols, and to process the scrambled symbols to obtain the first and second sets of output symbols.

4. The apparatus of claim 1, wherein the at least one processor is configured to scramble each of the multiple signaling symbols with a respective scrambling sequence to obtain multiple scrambled symbols for the signaling symbol, to form first and second sets of scrambled symbols, with each set including one scrambled symbol for each of the multiple signaling symbols, and to process the first and second sets of scrambled symbols to obtain the first and second sets of output symbols, one set of output symbols for each set of scrambled symbols.

5. The apparatus of claim 1, wherein the at least one processor is configured to scale the multiple signaling symbols with multiple gains determined based on transmit power for the multiple signaling symbols.

6. The apparatus of claim 5, wherein the at least one processor is configured to determine a largest gain and a smallest gain among the multiple gains, and to limit a ratio of the largest gain to the smallest gain to less than a predetermined value.

7. The apparatus of claim 1, wherein the at least one processor is configured to map the first set of output symbols to a first cluster of adjacent resource units in the first time frequency block and to map the second set of output symbols to a second cluster of adjacent resource units in the second time frequency block.

8. The apparatus of claim 1, wherein the multiple signaling symbols comprise acknowledgement (ACK) symbols.

9. A method for wireless communication, comprising:
processing multiple signaling symbols based on a first spreading matrix to obtain a first set of output symbols;
processing the multiple signaling symbols based on the first spreading matrix or a second spreading matrix to obtain a second set of output symbols;
mapping the first set of output symbols to a first time frequency block; and
mapping the second set of output symbols to a second time frequency block, each of the first and second time frequency blocks covering multiple subcarriers in multiple symbol periods, and each of the multiple signaling symbols being sent in both the first and second time frequency blocks.

10. The method of claim 9, further comprising:
scrambling the multiple signaling symbols to obtain scrambled symbols, and wherein the processing the multiple signaling symbols comprises processing the scrambled symbols to obtain the first and second sets of output symbols.

11. The method of claim 9, further comprising:
scaling the multiple signaling symbols with multiple gains determined based on transmit power for the multiple signaling symbols.

12. The method of claim 9, wherein the mapping the first set of output symbols comprises mapping the first set of output symbols to a first cluster of adjacent resource units in the first time frequency block, and wherein the mapping the second set of output symbols comprises mapping the second set of output symbols to a second cluster of adjacent resource units in the second time frequency block.

13. An apparatus for wireless communication, comprising:
means for processing multiple signaling symbols based on a first spreading matrix to obtain a first set of output symbols;
means for processing the multiple signaling symbols based on the first spreading matrix or a second spreading matrix to obtain a second set of output symbols;
means for mapping the first set of output symbols to a first time frequency block; and
means for mapping the second set of output symbols to a second time frequency block, each of the first and second time frequency blocks covering multiple subcarriers in multiple symbol periods, and each of the multiple signaling symbols being sent in both the first and second time frequency blocks.

14. The apparatus of claim 13, further comprising:
means for scrambling the multiple signaling symbols to obtain scrambled symbols, and wherein the means for processing the multiple signaling symbols comprises means for processing the scrambled symbols to obtain the first and second sets of output symbols.

15. The apparatus of claim 13, wherein the means for mapping the first set of output symbols comprises means for mapping the first set of output symbols to a first cluster of adjacent resource units in the first time frequency block, and wherein the means for mapping the second set of output symbols comprises means for mapping the second set of output symbols to a second cluster of adjacent resource units in the second time frequency block.

16. A computer program product, comprising:
non-transitory computer-readable medium comprising:
code for causing a computer to process multiple signaling symbols based on a first spreading matrix to obtain a first set of output symbols,
code for causing the computer to process the multiple signaling symbols based on the first spreading matrix or a second spreading matrix to obtain a second set of output symbols,
code for causing the computer to map the first set of output symbols to a first time frequency block; and
code for causing the computer to map the second set of output symbols to a second time frequency block, each of the first and second time frequency blocks covering multiple subcarriers in multiple symbol periods, and each of the multiple signaling symbols being sent in both the first and second time frequency blocks.

17. An apparatus for wireless communication, comprising:
at least one processor configured to obtain first and second sets of received symbols from first and second time frequency blocks used to send multiple signaling symbols with spreading, wherein the multiple signaling symbols are processed with a first spreading matrix to obtain a first set of output symbols and are also processed with the first spreading matrix or a second spreading matrix to obtain a second set of output symbols, and wherein the first set of output symbols is sent on the first time frequency block and the second set of output symbols is sent on the second time frequency block, each of the first and second time frequency blocks covering multiple subcarriers in multiple symbol periods, and each of the multiple signaling symbols being sent in both the first and second time frequency blocks, to process the first and second sets of received symbols to obtain multiple despread symbols, and to derive at least one signaling symbol estimate for at least one of the multiple signaling symbols based on the multiple despread symbols; and
a memory coupled to the at least one processor.

18. The apparatus of claim 17, wherein the at least one processor is configured to process each of the first and second sets of received symbols with a despreading matrix to obtain at least one of the multiple despread symbols.

19. The apparatus of claim 18, wherein the despreading matrix comprises an inverse discrete Fourier transform (IDFT) matrix or a Walsh matrix.

20. The apparatus of claim 17, wherein the at least one processor is configured to descramble the multiple despread symbols to obtain multiple descrambled symbols, and to derive the at least one signaling symbol estimate based on the multiple descrambled symbols.

21. The apparatus of claim 17, wherein the at least one processor is configured to determine weights for the first and second time frequency blocks, to scale the multiple despread symbols with the weights to obtain multiple scaled symbols, and to combine the multiple scaled symbols to obtain the at least one signaling symbol estimate.

22. The apparatus of claim 17, wherein the at least one processor is configured to obtain the first set of received symbols from a first cluster of adjacent resource units in the first time frequency block and to obtain the second set of received symbols from a second cluster of adjacent resource units in the second time frequency block.

23. The apparatus of claim 17, wherein the multiple signaling symbols comprise acknowledgement (ACK) symbols.

24. A method for wireless communication, comprising:
obtaining first and second sets of received symbols from first and second time frequency blocks used to send multiple signaling symbols with spreading, wherein the multiple signaling symbols are processed with a first spreading matrix to obtain a first set of output symbols and are also processed with the first spreading matrix or a second spreading matrix to obtain a second set of output symbols, and wherein the first set of output symbols is sent on the first time frequency block and the second set of output symbols is sent on the second time frequency block, each of the first and second time frequency blocks covering multiple subcarriers in multiple symbol periods, and each of the multiple signaling symbols being sent in both the first and second time frequency blocks;
processing the first and second sets of received symbols to obtain multiple despread symbols; and
deriving at least one signaling symbol estimate for at least one of the multiple signaling symbols based on the multiple despread symbols.

25. The method of claim 24, further comprising:
descrambling the multiple despread symbols to obtain multiple descrambled symbols; and
deriving the at least one signaling symbol estimate based on the multiple descrambled symbols.

26. The method of claim 24, wherein the processing the first and second sets of received symbols comprises processing each of the first and second sets of received symbols with a despreading matrix to obtain at least one of the multiple despread symbols.

27. The method of claim 24, wherein the deriving the at least one signaling symbol estimate comprises
determining weights for the first and second time frequency blocks,
scaling the multiple despread symbols with the weights to obtain multiple scaled symbols, and
combining the multiple scaled symbols to obtain the at least one signaling symbol estimate.

28. The method of claim 24, wherein the obtaining the first and second sets of received symbols comprises
obtaining the first set of received symbols from a first cluster of adjacent resource units in the first time frequency block, and
obtaining the second set of received symbols from a second cluster of adjacent resource units in the second time frequency block.

29. An apparatus for wireless communication, comprising:
means for obtaining first and second sets of received symbols from first and second time frequency blocks used to send multiple signaling symbols with spreading, wherein the multiple signaling symbols are processed with a first spreading matrix to obtain a first set of output symbols and are also processed with the first spreading matrix or a second spreading matrix to obtain a second set of output symbols, and wherein the first set of output symbols is sent on the first time frequency block and the second set of output symbols is sent on the second time frequency block, each of the first and second time frequency blocks covering multiple subcarriers in multiple symbol periods, and each of the multiple signaling symbols being sent in both the first and second time frequency blocks;

means for processing the first and second sets of received symbols to obtain multiple despread symbols; and means for deriving at least one signaling symbol estimate for at least one of the multiple signaling symbols based on the multiple despread symbols.

30. The apparatus of claim 29, further comprising:
means for descrambling the multiple despread symbols to obtain multiple descrambled symbols; and
means for deriving the at least one signaling symbol estimate based on the multiple descrambled symbols.

31. The apparatus of claim 29, wherein the means for processing the first and second sets of received symbols comprises means for processing each of the first and second sets of received symbols with a despreading matrix to obtain at least one of the multiple despread symbols.

32. A computer program product, comprising:
non-transitory computer-readable medium, comprising:
code for causing a computer to obtain first and second sets of received symbols from first and second time frequency blocks used to send multiple signaling symbols with spreading, wherein the multiple signaling symbols are processed with a first spreading matrix to obtain a first set of output symbols and are also processed with the first spreading matrix or a second spreading matrix to obtain a second set of output symbols, and wherein the first set of output symbols is sent on the first time frequency block and the second set of output symbols is sent on the second time frequency block, each of the first and second time frequency blocks covering multiple subcarriers in multiple symbol periods, and each of the multiple signaling symbols being sent in both the first and second time frequency blocks, code for causing the computer to process the first and second sets of received symbols to obtain multiple despread symbols, and code for causing the computer to derive at least one signaling symbol estimate for at least one of the multiple signaling symbols based on the multiple despread symbols.

33. The apparatus of claim 1, wherein the first and second sets of output symbols are obtained with the same spreading matrix.

34. The apparatus of claim 1, wherein the at least one processor is configured to generate multiple orthogonal frequency division multiplex (OFDM) symbols based on the first and second sets of output symbols mapped to the first and second time frequency blocks.

35. The apparatus of claim 1, wherein the at least one processor is configured to generate multiple single-carrier frequency division multiple access (SC-FDMA) symbols based on the first and second sets of output symbols mapped to the first and second time frequency blocks.

36. The apparatus of claim 13, wherein the first and second sets of output symbols are obtained with the same spreading matrix.

37. The apparatus of claim 13, further comprising:
means for generating multiple orthogonal frequency division multiplex (OFDM) symbols based on the first and second sets of output symbols mapped to the first and second time frequency blocks.

38. The apparatus of claim 13, further comprising:
means for generating multiple single-carrier frequency division multiple access (SC-FDMA) symbols based on the first and second sets of output symbols mapped to the first and second time frequency blocks.

39. The apparatus of claim 17, wherein the at least one processor is configured to perform single-carrier frequency division access (SC-FDMA) demodulation to obtain the first and second sets of received symbols.

40. The method of claim 24, further comprising:
performing single-carrier frequency division multiple access (SC-FDMA) demodulation to obtain the first and second sets of received symbols.

41. The apparatus of claim 29, further comprising:
means for performing single-carrier frequency division multiple access (SC-FDMA) demodulation to obtain the first and second sets of received symbols.

42. The method of claim 7, wherein the first and second sets of output symbols are obtained with the same spreading matrix.

43. The method of claim 7, further comprising:
generating multiple orthogonal frequency division multiplex (OFDM) symbols based on the first and second sets of output symbols mapped to the first and second time frequency blocks.

44. The method of claim 7, further comprising:
generating multiple single-carrier frequency division multiple access (SC-FDMA) symbols based on the first and second sets of output symbols mapped to the first and second time frequency blocks.

* * * * *